Dec. 6, 1966  J. C. SMELTZER  3,290,648
COMPARATOR
Filed Jan. 2, 1963  4 Sheets-Sheet 1
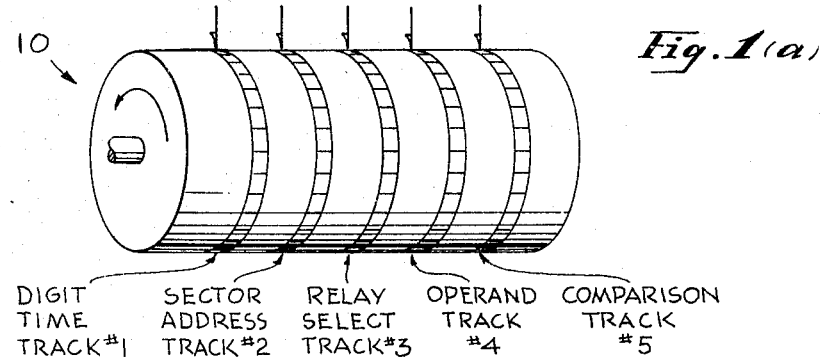
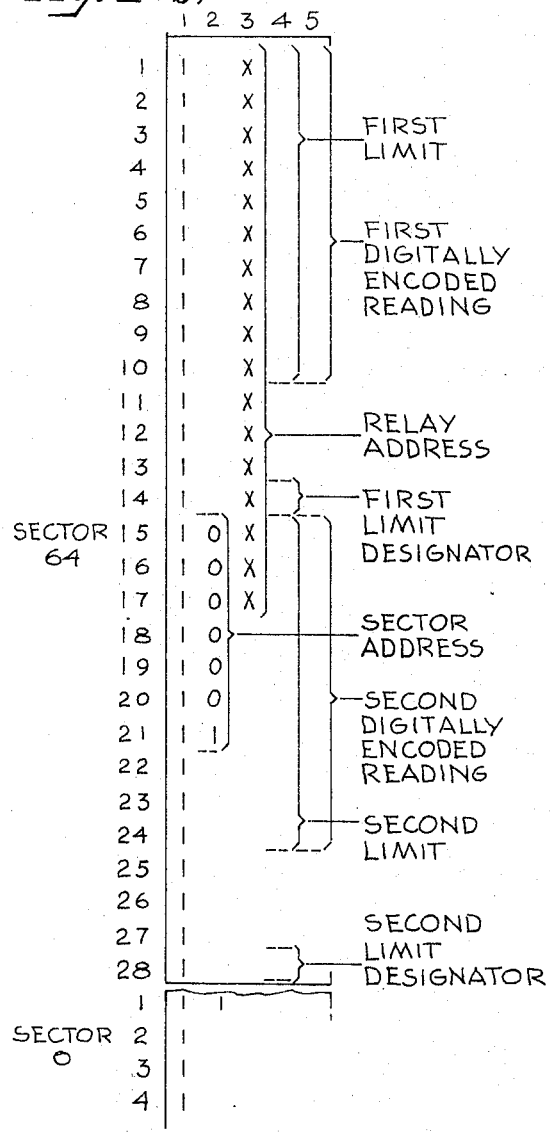
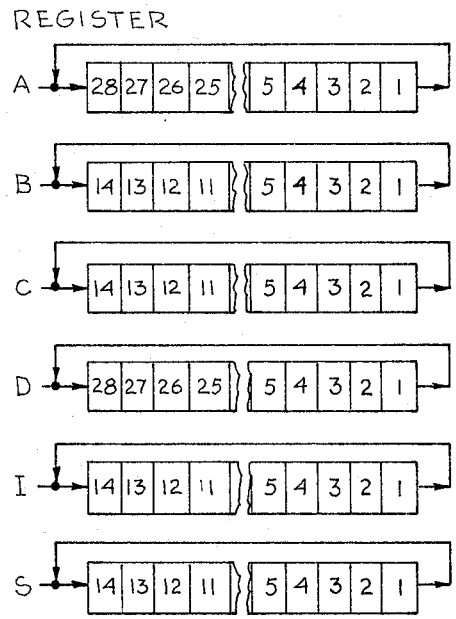
JACK C. SMELTZER
INVENTOR.
BY Arthur Freilich
ATTORNEY Dec. 6, 1966    J. C. SMELTZER    3,290,648
COMPARATOR
Filed Jan. 2, 1963    4 Sheets-Sheet 2

JACK C. SMELTZER
INVENTOR.

BY Arthur Freilich

ATTORNEY

JACK C. SMELTZER
INVENTOR.

BY Arthur Freilich

ATTORNEY

United States Patent Office 3,290,648
Patented Dec. 6, 1966

3,290,648
COMPARATOR
Jack C. Smeltzer, Woodland Hills, Calif., assignor, by mesne assignments, to The Bunker-Ramo Corporation, a corporation of Delaware
Filed Jan. 2, 1963, Ser. No. 248,999
19 Claims. (Cl. 340—146.2)

This invention relates generally to data processing apparatus and more particularly to apparatus capable of searching through a plurality of numbers to determine whether the magnitude of any one of the numbers falls outside of a range prescribed for that number.

Many modern industrial processes are extremely complex and in order to be controlled according to some criteria, as for example maximum output, several (up to perhaps 1000) process conditions must be periodically measured. Responsive to the measurements appropriate process variables are adjusted to optimize, for the current conditions, the functioning of the process. Processes, of course, have always been controlled in this fashion by an operator who, for example in the control of a steam generator, will periodically look at temperature and pressure gauges and adjust the water flow rate in accordance with some predetermined rules or criteria. In recent years, it has been recognized that data processing apparatus and more particularly, digital computers are well adapted to perform the operator's function of periodically scanning the measuring gauges or instruments and making adjustments in the process variables in accordance therewith and accordingly the use of digital techniques for this purpose is becoming increasingly common. The measuring instruments generally utilized are capable of generating analog voltages to represent their measurements. These voltages are fed through an analog-to-digital converter to generate digitally encoded signals which the digital computer is capable of processing.

Generally, a digital control computer is programmed to scan digitally encoded voltages and to calculate desired set points for various valves and other controls which are adapted to control the process variables. Means responsive to the set point calculations then adjust the valves and controls to establish the desired set points.

In order to properly control the process, it is essential for the computer to be able to recognize when an instrument reading falls outside of a range prescribed for it. For example, assume some temperature responsive device providing an analog voltage is known to be accurate over a range between 2 and 10 volts. If the reading falls outside this range, it is desirable that the computer respond in a particular manner. Initially, some output device, such as a printer, should be energized for the purpose of printing out information advising an operator that the instrument reads off scale. Secondly, the computer should ignore the off-scale reading in making calculations to determine the set points for the controls. This second step is desirable inasmuch as by definition, any reading outside of the 2 to 10 volt range is known to be highly inaccurate. Thirdly, it may be desirable to energize some audible or visual alarm to attract the attention of an operator or alternatively or additionally it may be desirable to stop the process. In any event, regardless of what action is taken in response to the recognition of an off-scale reading, apparatus capable of recognizing this off-scale reading must be provided.

Such apparatus must be capable of comparing each of a first set of numbers, which can represent the instrument readings with associated numbers representative of high and low limits to determine whether any one of the first set of numbers exceeds one of said limits. A number is said to exceed a limit if it is greater than a high limit or less than a low limit.

In other words, the function of the apparatus is to search through the first set of numbers comparing each with its associated limits. When the results of a comparison indicate that a number exceeds a limit, the comparison and the search are said to be successful. Additionally, the apparatus should preferably include means permitting the search to be performed on only a fraction of the set of numbers, i.e., by designating one number in the set as a starting point and a second number in the set as a terminating point. In many applications, however, it is desirable to terminate the search when the initial successful comparison is recognized rather than when the terminating point is reached.

Although prior art data processing apparatus has been utilized to perform high-low limit comparisons, such apparatus is programmed to successively access the number, access the high limit, subtract the number from the high limit, and recognize a negative difference as a successful comparison and then access the low limit, subtract the number from the low limit and again recognize a positive difference as a successful comparison.

The performance of these steps requires the expenditure of an extended amount of time and in addition requires that a relatively large amount of memory space be devoted to the storage of the program. For example, when using a rotating magnetic memory such as a disc or a drum, whose tracks are of the order of 128 words in length, it has been found that the comparison of a number with both high and low limits can occur at best at a rate of about 4 per drum revolution even assuming that all of the information is optimumly placed.

In the light of the deficiencies of prior art data processing techniques regarding the performance of high and low limit comparisons, it is an object of this invention to provide data processing apparatus particularly adapted to perform such comparisons.

It is a more general object of this invention to provide data processing apparatus particularly adapted to compare each of a first set of numbers with each of a second set of numbers.

It is an additional object of this invention to provide data processing apparatus capable of more rapidly performing high-low limit comparisons than was possible with heretofore known apparatus of similar cost and which is alternatively less expensive than heretofore known apparatus having comparable capabilities.

The present invention is based on the realization that data processing apparatus having only one read select matrix, thereby permitting only one word to be accessed from memory at a time, can most effectively compare numbers with high and low limits by storing each number twice in a single word length and by storing first and second limits in a single word length with designating bits carried in the limit word defining each limit, i.e., high or low. By then initially accessing the limit word from memory and subsequently the word containing the number, the high-low limit comparison can be completed in two word times. By extending this capability, 64 numbers can be compared in 128 word times. Assuming the capacity of a track in a rotatable storage medium to be 128 words in length, all of the numbers (128) in one track can be compared in 256 word times or two revolutions of the medium.

In a preferred embodiment of the invention, a magnetic drum is utilized as the storage medium and is provided with a plurality of tracks each including 128 sectors, a sector being adapted to store one word. A word time is defined as that interval of time between the moment the end of one sector passes under the read head and the moment the end of the next adjacent sector passes under the read head and, of course, represents the time required to read one word from the drum.

Each of the numbers to be compared is stored twice in each sector of one of the drum tracks, which will henceforth be called the comparison track. The two limits associated with each number are stored in the next adjacent sector on a second drum track which will henceforth be called the operand track. A control bit or designator is stored in the operand track with each of the limits to define whether the limit comprises a high or low limit. In operation, the operand and comparison tracks are read during alternate word time intervals. The information read from the operand track is loaded into a shift register and applied to a comparison means, together with the information read from the comparison track during the next word time. The designators associated with the limits set up the comparison means to recognize whether or not the number read from the comparison track exceeds the limit.

A significant feature of the invention resides in the provision of the control bit or designator as part of the limit word. This permits the easy reversal of the designator when a successful comparison occurs. This capability is desirable to prevent the same condition from repeatedly appearing to the equipment as a successful comparison. It will be recalled that in the event a successful comparison occurs, print out or alarm means are energized to call the condition to the attention of an operator. To call the operator's attention to this condition every drum revolution would represent an unnecessary expenditure of equipment and time. Rather than do this, when a successful comparison is initially recognized, the designator associated with the limit involved in the successful comparison is reversed so that thereafter the number will not be recognized as exceeding the limit until the number varies to a point where it would no longer exceed the original limit. When this occurs, it will, of course, exceed the reversed limit resulting in a successful comparison. Responsive to this latter successful comparison, appropriate information will be printed out and the control bit will again be reversed to establish the original conditions.

An additional feature of the invention resides in the provision of a pair of registers for holding address information respectively representing sectors on the drum at which the comparison sequence is started and terminated. In the event a successful comparison occurs prior to the time at which the terminating sector is reached, it can be made to terminate the sequence. As previously pointed out, only one-half of the numbers can be compared during one drum rotation; i.e. during the initial rotation of the drum subsequent to the starting sector being reached, limits are read from the operand track during odd word time intervals and numbers are read from the comparison track during even word time intervals. In order to consider the numbers and limits skipped over during the first drum rotation, a word time interval is ignored upon the completion of one drum revolution so that during the second drum revolution, limits are read from the operand track during even word time intervals and numbers are read from the comparison track during odd word time intervals.

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

FIGURE 1(a) is a perspective illustration of a typical magnetic drum memory;

FIG. 1(b) is a tabular illustration showing the manner in which information is arranged in a typical sector on each of the five drum tracks employed in the practice of the invention;

FIG. 1(c) is a schematic illustration of the six shift registers which are utilized to handle the requisite information to effect the desired comparisons;

With continuing reference to the drawings, initial attention is called to FIG. 1(a) wherein a magnetic drum 10 comprising one of several possible types of data processing memories suitable for use in the present invention is illustrated. As is conventional with magnetic drums, the drum 10 is divided into a plurality of circumferential tracks. Each of the tracks is in turn divided into a plurality of sectors. The information stored in each sector of each track is generally referred to as a word. Accordingly, a typical magnetic drum having 1,000 tracks and 128 sectors per track would have a 128,000 word capacity. A word in turn is comprised of a plurality of binary digits or bits and accordingly the bit capacity of the drum would be the product of the number of tracks, number of sectors per track and number of bits per sector.

For purposes herein, it will be sufficient to refer to only five of the drum tracks to present a complete understanding of the invention. It should be understood, however, that in use the invention will most likely be incorporated into data processing apparatus to provide a new capability not previously available to such apparatus, the new capability being in addition to the capabilities normally possessed by conventional data processing apparatus. Accordingly, the five tracks which will be referred to comprise five of many tracks actually existent in the memory. For purposes of illustration, it will be assumed that each track contains 128 sectors and that each sector contains 28 bits. Although in actual use, space bits should be provided between each sector, for simplicity sake in the present explanation, their presence will be ignored. Of course, a magnetic head for reading and writing is associated with each track.

Figure 2:
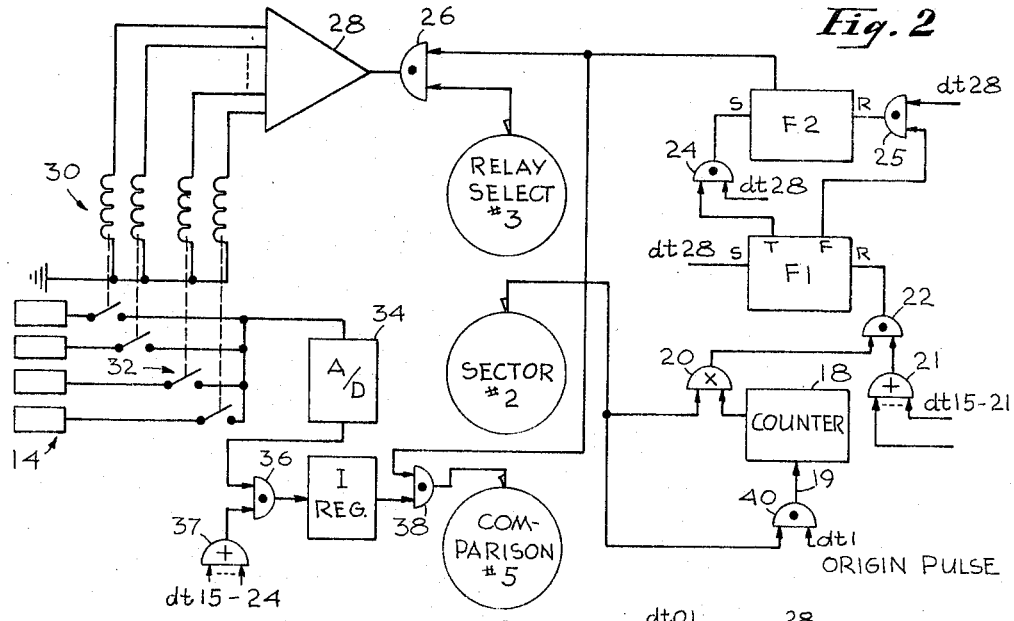
FIG. 2 is a schematic illustration of the apparatus employed to load the digitally encoded analog input information into the memory.

Track 1 comprises a digit time track. This track is filled with permanently recorded pulses (e.g. binary "1's") which are employed to drive a digit time counter which serves to synchronize all operations within the data processing apparatus of which the drum forms a part. The digit time counter (FIG. 2) is a scale of 28 counter and is incremented in response to the movement of each pulse on the digit track past the associated read head.

Track 2 comprises a sector address track in which is permanently recorded, in bit positions 15–21 of each sector thereof, binary information denoting the address of that sector. For example, note that in FIG. 1(b), the information recorded in the illustrated sector in track 2 comprises "1000000" which is the binary equivalent of decimal number 64. In the sector (not shown) following the sector illustrated in FIG. 1(b), the information recorded in bit positions 15–21 will be 1000001 which is the binary equivalent of decimal number 65. An origin pulse is recorded as shown in bit position 1 of sector 0 of track 2. The origin pulse is provided to enable the detection of every revolution of the drum.

Track 3 comprises a relay select track in which address information is stored in each sector thereof specifying sector addresses in the comparison track will be searched in a second drum revolution. In other words, during a first drum revolution, the operand track will be read during odd word time intervals and the comparison track will be read during even word time intervals and during a second drum revolution, the operand track will be read during even word time intervals and the comparison track will be read during odd word time intervals.

This alternating action is controlled by flip-flop F7 which, as will become more apparent below, operates in a toggling manner to cause the alternate reading of a word from the comparison track and a word from the operand track. Flip-flop F7 is always false in the word time immediately following the word time in which identity is recognized between the address of the sector being read and the starting address stored in the B register. Thereafter, flip-flop F7 will change state every word time so as to cause, assuming the starting sector address to be an even number, the operand track to be read when sectors having even numbered addresses are under the head, and to cause the comparison track to be read when sectors having odd numbered addresses are under the head. On the other hand, if the starting sector address is an odd number, the operand track will be read when sectors having odd numbered addresses are under the head and the comparison track will be read when sectors having even numbered addresses are under the head. If it is desired to compare only the numbers in the comparison track stored in sectors having odd numbered addresses with the corresponding limits in the operand track stored in sectors having even numbered addresses, even numbered starting and terminating addresses can be stored in registers B and C, respectively. All such comparisons can be made in one drum revolution. On the other hand, if it is desired to compare only the numbers in the comparison track stored in sectors having even numbered addresses with the corresponding limits in the operand track stored in sectors having odd numbered addresses, odd numbered starting and terminating addresses can be stored in registers B and C, respectively. All such comparisons can be made in one drum revolution. Further, if it is desired to compare all of the numbers in the comparison track with the corresponding limits in the operand track, such a comparison sequence can be performed in two drum revolutions by storing unlike, i.e., odd and even, starting and terminating addresses in registers B and C, respectively. Again, assuming an even numbered starting address, the search can be extended beyond one drum revolution by inhibiting the recognition of identity between a sector address being read and an odd numbered terminating address stored in the C register by proper use of the output of flip-flop F7. Similarly, an identity between a sector address and an even numbered terminating address can be inhibited from terminating the search if an odd numbred starting address is stored in the B register. Inhibition is effected by the connection of the true output terminal of flip-flop F7 to the input of gate 68. Since flip-flop F7 is always true during word times in which the sector being read is like the starting sector, i.e., odd or even, during the initial drum revolution after the search has been initiated, gate 68 will provide a true output only if the address stored in the C register is like the address stored in the B register. It is only in this case that the terminating address can cause the termination of the search within one drum revolution. As will be presented in greater detail below, upon the completion of one drum revolution, the toggling action of flip-flop F7 is caused to skip a word time; i.e., flip-flop F7 is maintained in one state for two word times. As a consequence, the alternate words in the operand and comparison tracks which were skipped over during the first drum revolution are then compared. The true output terminal of flip-flop F7 will then no longer inhibit the signal from flip-flop F5, representing identity between the terminating address and the sector address being read, from resetting flip-flop F3, through gates 66 and 68, to thereby terminate the search.

At digit time 1 flip-flops F4 and F5 are true by virtue of their having been set at digit time 28. Assume that flip-flop F3, and consequently flip-flop F7, are false. Additionally assume that flip-flop F6 is false. Every digit time 28, flip-flop F4 will be set. It will be reset during digit times 15-21 during every word time in which the sector address read by the head associated with the sector address track 2 differs from the address stored in the shift register B. When the address detected by the read head is identical with the address stored in the shift register B, flip-flop F4 will not be reset and accordingly at digit time 28, a true output signal will be provided by gate 48 to set flip-flop F3. Inasmuch as flip-flop F7 is false, the output derived from the read head of operand track 4 will be gated through gate 64 to the shift register A. The following digit time 28, the inputs to gate 56 will all be true and accordingly flip-flop F7 will be set to thereby gate the output derived from the read head of comparison track 5 through gate 62 to the comparison means 42 to be compared with the information in shift register A derived from the operand track the previous word time.

At the next digit time 28, all of the inputs to gate 60 will be true and as a consequence, the output thereof and the output of gate 58 will be true, thereby resetting flip-flop F7 to cause the output derived from the read head of operand track 4 to be gated through gate 64 into the shift register A. It can be seen, therefore, that flip-flop F7 alternates between a true and false condition each digit time 28 and as a consequence, information is alternately read out of the operand and comparison tracks into the shift register A and comparison means 42.

It will be appreciated that the true output of gate 50 occurring at digit time 27 during the word time in which there is identity between the sector address read by the head of sector address track 2 and the sector address stored in the shift register B will have no effect on flip-flop F6 since flip-flop F3 will be false at that time. At all word times subsequent to that time, flip-flop F4 will be false at digit time 27 and accordingly gate 50 will not provide a true output. However, upon the completion of one revolution of the drum, the address read by the head of sector address track 2 will again be identical to that stored in the shift register B and as a consequence, gate 50 will provide a true output at digit time 27. Gate 52 will then provide a true output so as to set flip-flop F6. As a result of flip-flop F6 becoming true, gates 62 and 64 will be disabled and flip-flop F7 will be inhibited from going false. At the next digit time 27, however, flip-flop F6 will be reset by the output of gate 54 so as to remove the inhibition from gates 60, 62 and 64. It will accordingly be appreciated that the effect of setting flip-flop F6 for one word time is to skip over one sector on the operand track upon the completion of one drum revolution. As should be apparent, this is done to permit the alternate sectors on the operand track which were not read during the first revolution to be read during the second revolution, i.e., if the odd address sectors were read from the comparison track during the first revolution, the even address sectors will be read from the comparison track during the second revolution. In this manner, the numbers stored in all of the comparison track sectors will be searched in two drum revolutions.

As previously noted, when a successful comparison occurs, comparison means 42 will provide a true output to thereby reset flip-flop F3 so as to inhibit gates 62 and 64. It is pointed out that the output of gate 65 is loaded into register A at the same time it is being presented to comparison means 42. This is done to permit any number to be immediately available upon recognizing that it is out of limits. When a true output signal is provided by comparison means 42, the number in register D is caused to circulate. By retaining the number in register A, it can be immediately utilized and thereby avoids the one revolution time wait which would be required to access it from the drum. If a successful comparison does not reset flip-flop F3, it will be reset when the sector address read by the head of sector address track 2 is identical to the address stored in shift register C. It will be recalled that such an identity will be recognized in one drum revolution if the addresses in the B and C registers are alike, i.e., odd or even and in more than one drum revolution if they are not alike. It will be realized that this identity will prevent flip-flop F5 from being reset and as a consequence AND gate 68 will provide a true output upon the occurrence of the next digit time 28 which will be gated through gate 66 to reset flip-flop F3.

Figure 4:
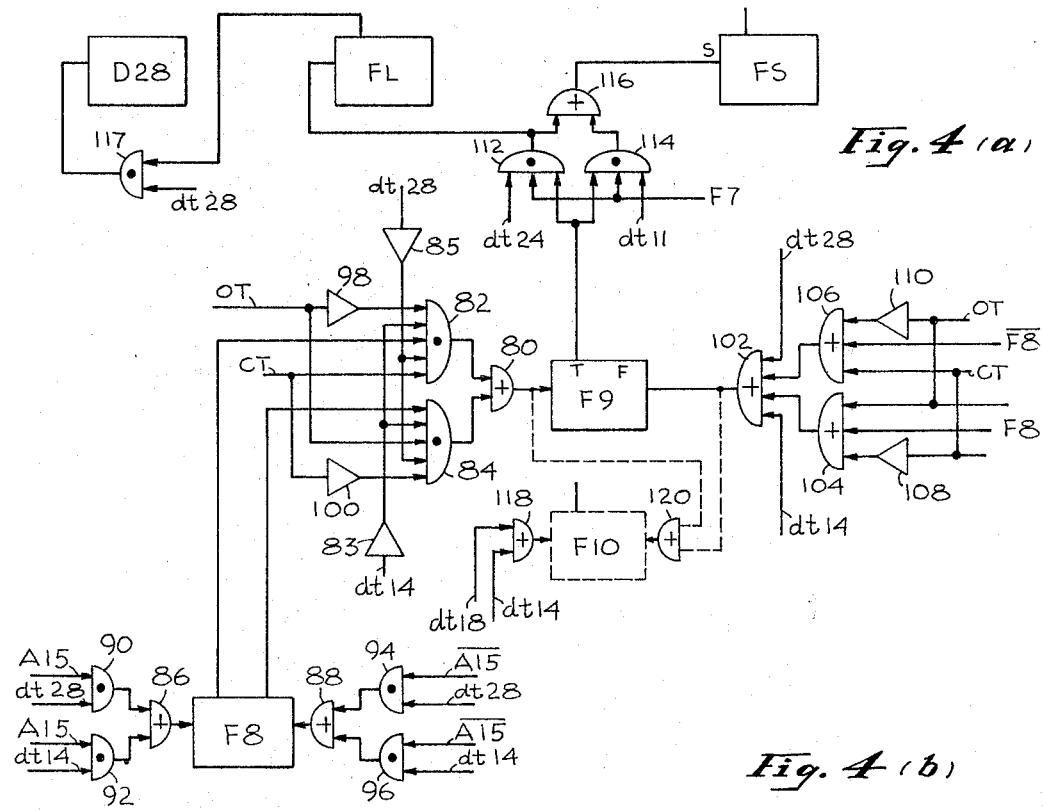
FIG. 4(a) is a schematic illustration of the comparison means.
FIG. 4(b) is a truth table illustrating the response of the comparison means to different input conditions.
FIG. 4(c) is a timing diagram illustrating the states assumed by various flip-flops responsive to exemplary analog input and limit information.

Attention is now called to FIG. 4(a) wherein the details of comparison means 42 are illustrated. It will be recalled that first and second limits are stored in bits 1–10 and 15–24 respectively of the sectors of the operand track 4. Moreover, bits 14 and 28 are designators respectively defining the nature of the first and second limits; i.e., a binary "1" in bits 14 and 28 will define a low limit and a binary "0" will define a high limit. In order to illustrate the action of comparison means 42, attention is called to the truth table of FIG. 4(b). In columns 1 and 2 thereof, exemplary values of bits derived from the operand track 4 and comparison track 5 are illustrated. Flip-flop F8 in digit times 1–14 assumes the state designated by the designator in bit position 14 and in digit times 15–28 assumes the state designated by the designator in bit position 28. Initially assume that the designator is "1" (column 3) meaning that a successful search occurs when the digits derived from the comparison track are greater in magnitude than the corresponding limit derived from the operand track. By considering the digits of the number and limit from least to most significant bit in accordance with the truth table, the final state of the flip-flop F9 will indicate at digit times 11 and 24 whether the associated limit was exceeded. Note that only in line 2 is flip-flop F9 set when the designator is "1". For all other output conditions of the comparison and operand tracks flip-flop F9 is reset. Alternately, when the designator is "0", it defines a low limit and then the only comparison that sets flip-flop F9 is when the output of the operand track is "1" and the comparison track is "0" (line 7, FIG. 4(b)). Accordingly, for all other output conditions of the comparison and operand tracks, flip-flop F9 will be reset and the output of the comparison means 42 will be "0".

With the truth table of FIG. 4(b) in mind, attention is now called to FIG. 4(a). Therein, a flip-flop F9 is provided whose true output terminal is utilized to set a flip-flop FS whose true output line emerges from comparison means 42. Connected to the set input terminal of flip-flop F9 is an OR gate 80 whose inputs respectively comprise the outputs of AND gates 82 and 84. The true and false outputs of flip-flops F8 are respectively connected to the inputs of gates 82 and 84. Flip-flop F8 is utilized to store the designator of the limit currently being considered by the comparison means 42. That is, during digit times 1–10 flip-flop F8 will store the designator of bit position 14. After digit time 14, flip-flop F8 will store the designator of bit position 28. In order to drive flip-flop F8 to its appropriate condition, OR gates 86 and 88 are respectively connected to its set and reset terminals. The outputs of AND gates 90 and 92 are connected to the input of OR gate 86 while the outputs of AND gates 94 and 96 are connected to the input of gate 88. The inputs to gate 90 comprise the true output terminal of flip-flop A15 (stage 15 of the shift register A) and the digit time terminal 28. Similarly, the inputs of gate 94 comprise the false output from flip-flop A15 and the digit time terminal 28. The application of the outputs of gates 90 and 94 to flip-flop F8 assures that it is in the condition defined in bit position 14 of the operand track sector at digit time "1" of the word time during which the comparison track sector is being read into the comparison means 42. Similarly, the inputs to gate 92 comprise the true output of flip-flop A15 and the digit time terminal 14 while the inputs to gate 96 comprise the false output of flip-flop A15 and digit time terminal 14. The application of the outputs of gates 92 and 96 to flip-flop F8 assures that it assumes the condition of the designator of bit position 28 at digit time 14.

Figure 3:
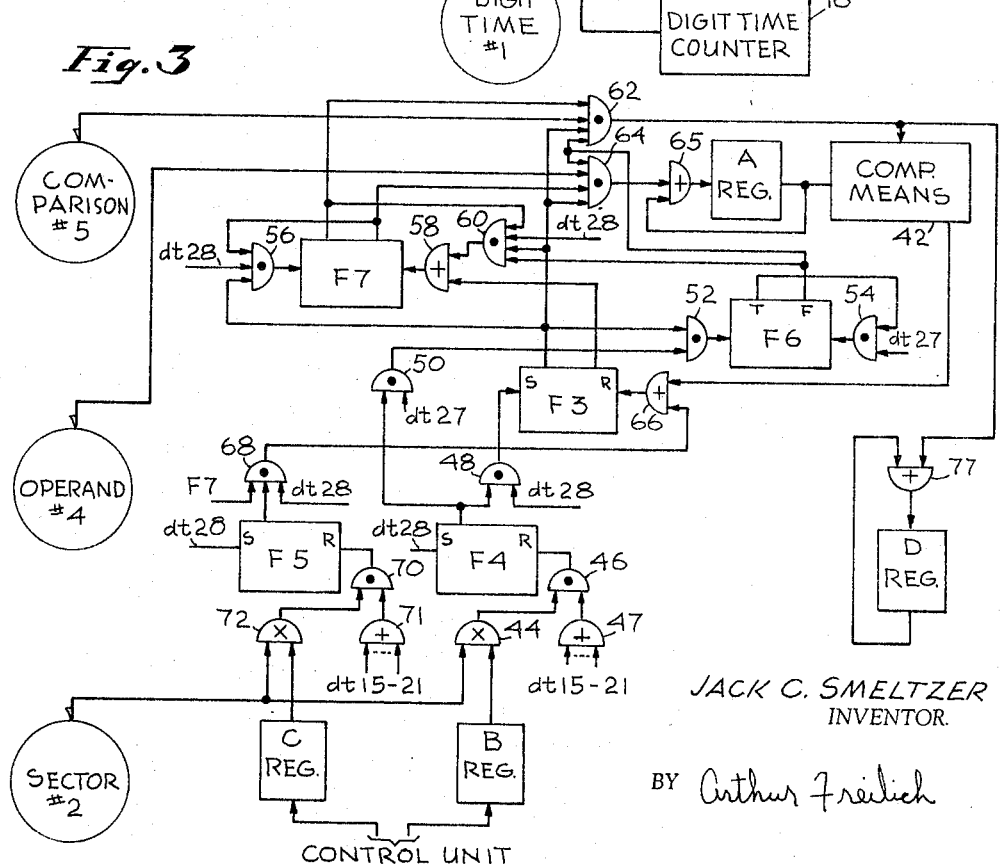
FIG. 3 is a schematic illustration of the apparatus utilized to sequentially provide the digitally encoded analog inputs together with associated limit information to a comparison means.

The bits of the limit word derived from the operand track and stored in the shift register A (FIG. 3) are applied directly to gate 84 and through inverter 98 to gate 82. The information from comparison track 5 is derived from AND gate 62 (FIG. 3) and is applied directly to gate 82 and through inverter 100 to gate 84. It should be appreciated that gates 82 and 84 respectively implement lines 2 and 7 of the truth table shown in FIG. 4(b). In addition digit time terminals 14 and 28 are respectively applied through inverters 83 and 85 to the input of gates 82 and 84.

Connected to the reset input terminal of flip-flop F9 is an OR gate 102 whose inputs respectively comprise digit time terminals 14 and 28 and the outputs of OR gates 104 and 106. The true and false output terminals of flip-flop F8 are respectively connected to the input of gates 104 and 106. The output from the operand track derived from shift register A is applied directly to gate 104 and through inverter 110 to gate 106. The output from the comparison track derived from gate 62 is applied directly to gate 106 and through inverter 108 to gate 104. It should be apparent that gates 104 and 106 respctively implement lines 3 and 6 of the truth table of FIG. 4(b).

The true output terminal of flip-flop F9 is connected to the input of AND gates 112 and 114. The true output terminal of flip-flop F7 (FIG. 3) is additionally connected to the input of gates 112 and 114. Digit time terminal 11 is connected to the input of gate 114 while digit time terminal 24 is connected to the input of gate 112. The outputs of gates 112 and 114 are respectively connected to the input of gate 116 whose output is connected to the set input terminal of flip-flop FS whose true output terminal comprises the output of comparison means 42.

In order to illustrate the operation of the comparison means 42, attention is called to FIG. 4(c) wherein an exemplary number derived from the comparison track and an exemplary limit derived from the operand track are shown being compared when the flip-flop F8 has been set meaning that the limit is a high limit. Flip-flop F9 is reset at digit times 14 and 28 by virtue of the connection of digit time terminals 14 and 28 to OR gate 102. The connection of these terminals through inverters 83 and 85 to gates 82 and 84 prevents the simultaneous applications of signals to both the set and reset input terminals of flip-flop F9. Note that at digit time 1 the bits derived from the operand track and comparison track are both "0" and accordingly flip-flop F9 remains reset. Note that at digit time 2, the bit derived from the comparison track is 1 while the bit derived from the operand track is 0 and as a consequence flip-flop F9 is set meaning that to this extent the number derived from the comparison track exceeds the high limit derived from the operand track. Note that flip-flop F9 remains set until digit time 6 when it is reset because the bit derived from the operand track is greater than the bit derived from the comparison track. At digit time 8, flip-flop F9 is again set while at digit time 9 it is reset and remains reset through digit time 10. It should accordingly be realized that the condition of flip-flop F9 at digit time 11 determines whether or not the number being compared exceeds its associated limit.

It will be recalled that when comparison means 42 generated a true output signal the number recognized as being out of limits was circulated in register D. In addition to having the number available, it is desirable to store information along therewith which indicates which limit was exceeded. For this purpose the set input terminal of flip-flop FL is connected to the output of gate 112. The true output of flip-flop FL is connected to the input of gate 117 together with digit time terminal 28. The output of gate 117 is connected to the set input terminal of flip-flop D28 (28th stage of register D).

It is pointed out that to this extent the comparison means has been described as being able only to determine if a number exceeds the limit but not being able to determine whether it is equal to the limit. If this capability is desirable, flip-flop F10 illustrated in dotted lines can be provided. Connected to the set input terminal of flip-flop F10 is an OR gate 118 whose inputs respectively comprise digit time terminals 14 and 28. Connected to the reset input terminal of flip-flop F10 is an OR gate 120 whose inputs respectively comprise the outputs of gates 80 and 102. It will be apparent that flip-flop F10 is set at every digit time 28 and 14. If gates 80 or 102 provide an output, which one of them will always do whenever the bits derived from the operand track and comparison track are unequal, flip-flop F10 will be reset. By looking at the condition of flip-flop F10 at digit times 11 and 24, equality between the number derived from the comparison track and the limit derived from the operand track is indicated by a true state of flip-flop F10.

Alarm means (not shown) can be provided responsive to the output of comparison means 42 to indicate to a system operator that one of the instrument readings exceeds a limit. In systems where such an occurrence is not indicative of any significant catastrophe, it may merely be desirable to energize some output printer (not shown) to print out the occurrence. In order to prevent the energization of the printer each time this comparison sequence is performed, which would always result in the termination of the sequence, it is advisable to provide means enabling any subsequent successful comparisons to be ignored. This capability permits the system operator to correct the condition as he sees fit without redundantly energizing the printer every time a comparison sequence is initiated.

Figure 5:
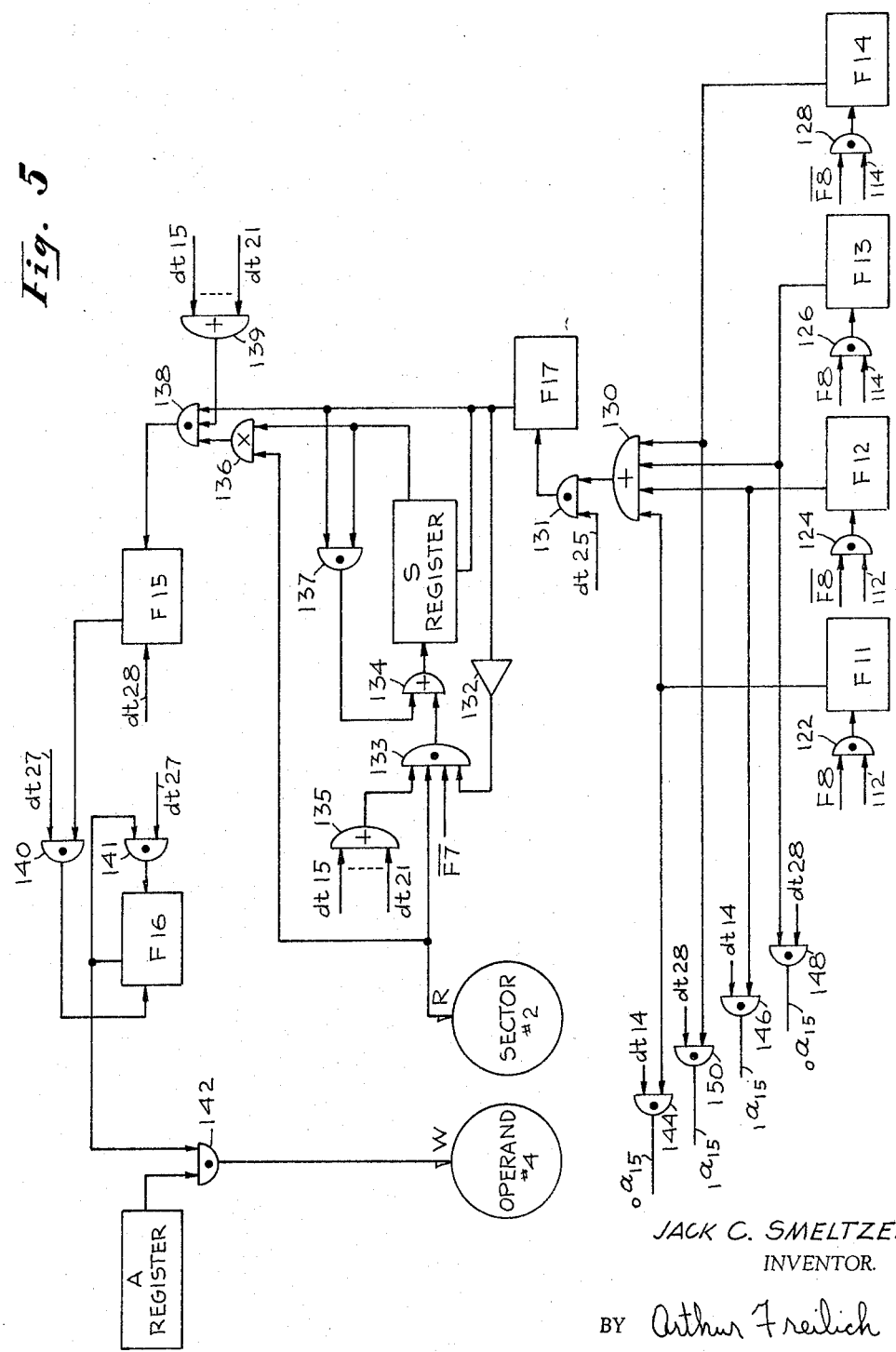
FIG. 5 is a schematic illustration of the apparatus utilized to automatically change the state of the flag bit in the limit word responsive to a successful comparison.

In order to avoid this print out redundancy, apparatus is provided, as shown in FIG. 5, for changing the designator associated with the limit when it is found that the limit has been exceeded. For example, assume that an instrument reading is 11 volts and its associated high limit is 10 volts. When the reading is first recognized as exceeding the limit, the designator defining the type of limit is changed to effectively make it a 10 volt low limit. Thereafter, the equipment will recognize that the reading does not exceed the 10 volt low limit until the reading falls to perhaps 9 volts. At this time, a successful comparison will again be recognized, again causing a read out which the operator can then interpret as the instrument coming back within limits. Again, the designator defining the type of limit is changed in response to the successful comparison thereby permitting normal operation to resume.

The equipment provided in FIG. 5 makes use of the operand track 4 and the sector address track 2. Additionally, 4 flip-flops F11, F12, F13 and F14 are provided to respectively store information identifying the particular reason that the successful comparison occurred. For this purpose, the flip-flops are respectively provided with gates 122, 124, 126 and 128 connected to their set input terminals. The output of gate 112 is connected to the input of gates 122 and 124 while the output of gate 114 is connected to the input of gates 126 and 128. Additionally, the true output terminal of flip-flop F8 is connected to the input of gates 122 and 126 while the false output terminal flip-flop F8 is connected to the input of gates 124 and 128. It will be appreciated, therefore, that if a successful comparison is recognized at digit time 24, flip-flop F11 will be set if flip-flop F8 had been true and flip-flop F12 will be set if flip-flop F8 had been false. Similarly, if a successful comparison is recognized at digit time 11, flip-flop F13 will be set if flip-flop F8 had been true and flip-flop 14 will be set if F8 had been false. The true output terminals of flip-flops F11, F12, F13 and F14 are connected to the input of OR gate 130 whose output is connected to the input of AND gate 131 together with digit time terminal 25. The output of gate 131 is connected to the set input terminal of flip-flop F17 whose true output terminal is connected through an inverter 132 to the input of AND gate 133. Additionally, the false output terminal of flip-flop F7 (FIG. 3), the read head of sector address track 2, and the output of OR gate 135 are connected to the input of gate 133. Digit time terminals 15–21 are connected to the input of gate 135.

The output of gate 133 is connected to the input of OR gate 134 whose output is connected to the input of shift register S whose output in turn is coupled to the input of exclusive OR gate 136 together with the read head of sector address track 2. The inputs to AND gate 137 comprise the true output terminal of flip-flop F17 and the output of register S. The output of gate 137 is connected to the input of gate 134. The output of gate 136 is applied to the input of gate 138 together with the true ouput terminal of flip-flop F17 and the output of OR gate 139. The inputs of gate 139 comprise digit time terminals 15–21. The output of gate 138 is connected to the reset input terminal of flip-flop F15 and the set input terminal thereof is connected to digit time terminal 28. The true output terminal of flip-flop F15 is connected to the input of AND gate 140 together with the digit time terminal 27. The output of AND gate 140 is connected to the set input terminal of flip-flop F16. The true output terminal of flip-flop F16 is connected to the input of gate 142 together with the output of shift register A and to the input of AND gate 141 together with digit time terminal 27. The output of gate 141 is connected to the reset input of flip-flop F16. The output of gate 142 is connected to the write head associated with the operand track 4.

In operation, the sector addresses normally read by the head of sector address track 2 are stored in shift register S during digit times 15–21 in those word times when flip-flop F7 is false. It will be recalled that when flip-flop F7 is false, information is being read from the operand track into the shift register A. When one of the flip-flops F11, F12, F13 or F14 is set responsive to a successful comparison, the output of gate 130 will become true thereby setting flip-flop F17 and inhibiting new information from being stored in shift register S. Instead, the sector address in shift register S will circulate through gates 137 and 134. However, the true output signal from flip-flop F17 will modify the sector address in register S by subtracting one therefrom in order to make the sector address therein correspond to the address of the sector storing the limit which was exceeded. Thereafter, the sector addresses read by the head of sector address track 2 will be compared for identity with the sector information stored in the register S. Each digit time 28, flip-flop F15 will be set and will be reset in digit times 15–21 until identity occurs. When identity does occur, at digit time 27 flip-flop F15 will be true and accordingly gate 140 will provide an output to set flip-flop 16. The true output terminal of flip-flop F16 in turn gates the contents of shift register A through gate 142 causing it to be written back into the appropriate sector on the operand track. Prior to gating the contents of the A register through gate 142, the designator associated with the limit involved in the successful comparison was modified. This was accomplished by freezing the contents of the shift register A as soon as the successful comparison was noted. This action resulted from the resetting of flip-flop F3 which prevented any new information derived from gate 64 from being stored in shift register A and by permitting circulation through gate 65. The appropriate designator was actually modified while in the shift register A by the output of one of gates 144, 146, 148 or 150 whose inputs are respectively connected to the true output terminals of flip-flops F11, F12, F13 and F14. The second input to gates 148 and 150 comprises digit time terminal 28 while the second input to gates 144 and 146 comprises digit time terminal 14. The outputs of gates 144 and 148 are respectively connected to the reset input terminal of flip-flop A15 of the A register and the outputs of gates 146 and 150 are connected to the set input terminal thereof. Accordingly, it should be apparent that upon the recognition of a successful comparison, the designator associated with the limit involved with that comparison will be automatically modified to thereby prevent the same comparison from again energizing the alarm or print out means.

From the foregoing, it should be apparent that data processing apparatus has herein been disclosed which is particularly adapted for use in process control systems to enable instrument readings to be compared with prescribed high and low limits to determine whether the readings fall within a prescribed range. It should be apparent, however, that the invention finds utility in systems other than ones for controlling industrial processes. In this respect, the invention can be advantageously utilized wherever it is desired to compare each of a first set of numbers with a second set of numbers to determine relative magnitude in an expeditious manner. It is pointed out that each of the first set of numbers can be compared in magnitude with one of the second set of numbers. That is, the invention finds significant utility even where the numbers in the second set do not define a range, between high and low limits, but rather merely define a single limit.

In addition, the invention finds considerable utility in process control systems for scanning a plurality of digital inputs as, e.g. where it is desired to check the status of a plurality of bistable relays. The status of each relay can of course be represented by a binary "1" or "0." The plurality of relays can be divided into a plurality of groups each group including 28 relays. Instead of comparing information from the comparison track with information from the operand track as has been shown, a simple gating selection matrix apparatus can be utilized to provide the relay information derived from each group to the comparison means 42 so that it appears the same as if it constituted information read from the comparison track. In this event, the comparison means can effectively comprise an exclusive OR gate so that it is capable of providing a true output signal representing success whenever the inputs thereto are not identical.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The embodiments of the invention in which an exclusive property or privilege is claimed are defined as follows:

1. Data processing apparatus adapted to compare each of a first set of numbers with a corresponding number in a second set of numbers comprising:
   memory means;
   means storing information representing said first set of numbers in said memory means;
   means storing information representing said second set of numbers in said memory means;
   means for accessing information from said memory means;
   means connected to and controlling said memory accessing means for accessing information representing a series of numbers comprised of every other second set number and for accessing information representing a different first set number between each pair of adjacent numbers in said series;
   register means for successively storing said information representing each of said second set numbers; and
   means for comparing said information stored in said register means with information representing a first set number during the time said first set number information is being accessed.

2. Data processing apparatus adapted to compare each of a first set of numbers with a corresponding number in a second set of numbers to determine whether the magnitude of the number in said first set is greater or less than the corresponding number in said second set comprising:
   memory means defining a plurality of word locations;
   means storing each of said first set numbers in a unique word location;
   means storing each of said second set numbers in a unique word location;
   timing means defining word time intervals;
   means for accessing the contents of one word location during each word time interval;
   means connected to and controlling said memory accessing means to cause second and first set numbers to be alternately accessed from said memory means in adjacent word time intervals; and
   means for comparing each accessed second set number with a first set number accessed one word time interval later during the word time interval in which said first set number is accessed.

3. Data processing apparatus adapted to compare each of a first set of numbers with a corresponding number in a second set of numbers constituting limits to determine whether the magnitude of the number in said first set is greater than a high limit or less than a low limit comprising:
   memory means defining a plurality of word locations;
   means storing each of said first set numbers in a unique word location;
   means storing each of said second set numbers together with designator information designating whether said second set number represents a high or low limit, in a unique word location;
   timing means defining word time intervals;
   means for accessing the contents of one word location during each word time interval;
   means connected to and controlling said memory accessing means to cause second and first set numbers to be alternately accessed from said memory means in adjacent word time intervals; and
   means responsive to said designator information derived together with the accessed second set number for comparing the second set number with a first set number accessed one word time interval later during the word time interval in which said first set number is accessed.

4. Data processing apparatus adapted to compare each of a first set of numbers with a corresponding number in second set of numbers to determine whether the number in said first set is greater or less than the corresponding number in said second set comprising:
   memory means including first and second sections each defining a plurality of word locations;
   means storing each of said first set numbers twice in a unique word location in said first memory section;
   means storing a pair of said second set numbers in each word location in said second memory section;
   timing means defining word time intervals;
   means for accessing the contents of one word location during each word time interval;
   means connected to and controlling said memory accessing means to cause information to be alternately accessed from said first and second memory sections in adjacent word time intervals; and means for comparing each of the two accessed second set numbers with a first set number accessed one word time interval later during the word time interval in which said first set number is accessed.

5. Data processing apparatus adapted to compare each of a first set of numbers with corresponding numbers in a second set of numbers constituting limits to determine whether the magnitude of the number in said first set is greater than a high limit or less than a row limit comprising:

memory means including first and second sections each defining a plurality of word locations;

means storing each of said first set numbers twice in a unique word location in said first memory section;

means storing a pair of said second set numbers together with designator information designating whether each number represents a high or low limit, in a unique word location in said second memory section;

timing means defining word time intervals;

means for accessing the contents of one word location during each word time interval;

means connected to and controlling said memory accessing means to cause information to be alternately accessed from said first and second memory sections in adjacent word time intervals; and means responsive to said designator information derived together with each accessed second set number for comparing the second set number with a first set number accessed one word time interval later during the word time interval in which said first set number is accessed.

6. Data processing apparatus adapted to compare each of a first set of numbers with corresponding numbers in a second set of numbers constituting limits to determine whether the magnitude of the number in said first set is greater than a high limit or less than a low limit comprising:

memory means including first and second sections each defining a plurality of word locations;

means storing each of said first set numbers twice in a unique word location in said first memory section;

means storing a pair of said second set numbers together with designator information designating whether each number represents a high or low limit, in a unique word location in said second memory section; timing means defining word time intervals;

means for accessing the contents of one word location during each word time interval;

means connected to and controlling said memory accessing means to cause information to be alternately accessed from said first and second memory sections in adjacent word time intervals;

comparing means responsive to said designator information derived together with each accessed second set number for comparing the second set number with a first set number accessed one word time interval later during the word time interval in which said first set number is accessed;

said comparing means including means for generating a signal in response to a successful comparison defined as a comparison between a first set number whose magnitude is greater than an associated high limit or less than an associated low limit; and means responsive to said signal for changing the designator information associated with the limit involved in the successful comparison.

7. Data processing apparatus adapted to compare each of a first set of numbers with corresponding numbers in a second set of numbers constituting limits to determine whether the magnitude of the number in said first set is greater than a high limit or less than a low limit comprising:

memory means including first and second sections each defining a plurality of word locations;

means storing each of said first set numbers twice in a unique word location in said first memory section;

means storing a pair of said second set numbers together with designator information designating whether each number represents a high or low limit, in a unique word location in said second memory section;

timing means defining word time intervals;

means for accessing the contents of one word location during each word time interval;

means connected to and controlling said memory accessing means to cause information to be alternately accessed from said first and second memory sections in adjacent word time intervals;

comparing means responsive to said designator information derived together with each accessed second set number for comparing the second set number with a first set number accessed one word time interval later during the word time interval in which said first set number is accessed;

said comparing means including means for generating a signal in response to a successful comparison defined as a comparison between a first set number whose magnitude is greater than an associated high limit or less than an associated low limit;

register means; and means responsive to said signal for storing the first set number involved in said successful comparison in said register means.

8. Data processing apparatus adapted to compare each of a first set of numbers with corresponding numbers in a second set of numbers constituting limits to determine whether the magnitude of the number in said first set is greater than a high limit or less than a low limit comprising:

memory means including first and second sections each defining a plurality of word locations;

means storing each of said first set numbers twice in a unique word location in said first memory section;

means storing a pair of said second set numbers together with designator information designating whether each number represents a high or low limit, in a unique word location in said second memory section;

timing means defining word time intervals;

means for accessing the contents of one word location during each word time interval;

means connected to and controlling said memory accessing means to cause information to be alternately accessed from said first and second memory sections in adjacent word time intervals;

comparing means responsive to said designator information derived together with each accessed second set number for comparing the second set number with a first set number accessed one word time interval later during the word time interval in which said first set number is accessed;

said comparing means including means for generating a signal in response to a successful comparison defined as a comparison between a first set number whose magnitude is greater than an associated high limit or less than an associated low limit;

register means;

means responsive to said signal for storing the first set number involved in said successful comparison in said register means; and means for storing information in said register means identifying which of the pair of second set numbers were involved in said successful comparison.

9. Data processing apparatus adapted to compare each of a first set of numbers with corresponding numbers in a second set of numbers constituting limits to determine whether the magnitude of the number in said first set is greater than a high limit or less than a low limit comprising:
   memory means including first and second sections each defining a plurality of word locations;
   means storing each of said first set numbers twice in a unique word location in said first memory section;
   means storing a pair of said second set numbers together with designator information designating whether each number represents a high or low limit, in a unique word location in said second memory section;
   timing means defining word time intervals;
   means for accessing the contents of one word location during each word time interval;
   means connected to and controlling said memory accessing means to cause information to be alternately accessed from said first and second memory sections in adjacent word time intervals;
   comparing means responsive to said designator information derived together with each accessed second set number for comparing the second set number with a first set number accessed one word time interval later during the word time interval in which said first set number is accessed;
   said comparing means including means for generating a signal in response to a successful comparison defined as a comparison between a first set number whose magnitude is greater than an associated high limit or less than an associated low limit;
   register means; and
   means responsive to said signal for storing address information in said register means identifying the unique word location in which the second set number involved in said successful comparison is stored.

10. Data processing apparatus adapted to compare each of a first set of numbers with corresponding numbers in a second set of numbers constituting limits to determine whether the magnitude of the number in said first set is greater than a high limit or less than a low limit comprising:
   memory means including first and second sections each defining a plurality of word locations;
   means storing each of said first set numbers twice in a unique word location in said first memory section;
   means storing a pair of said second set numbers together with designator information designating whether each number represents a high or low limit, in a unique word location in said second memory section;
   timing means defining word time intervals;
   means for accessing the contents of one word location during each word time interval;
   first register means;
   means storing address information in said first register means identifying the word location at which said memory accessing is initiated;
   means connected between said first register means and said memory accessing means for controlling said memory accessing means to cause information to be alternately accessed from said first and second memory sections in adjacent word time intervals; and
   comparing means responsive to said designator information derived together with each accessed second set number for comparing the second set number with a first set number accessed one word time interval later during the word time interval in which said first set number is accessed.

11. Data processing apparatus adapted to compare each of a first set of numbers with corresponding numbers in a second set of numbers constituting limits to determine whether the magnitude of the number in said first set is greater than a high limit or less than a low limit comprising:
   memory means including first and second sections each defining a plurality of word locations;
   means storing each of said first set numbers twice in a unique word location in said first memory section;
   means storing a pair of said second set numbers together with designator information designating whether each number represents a high or low limit, in a unique word location in said second memory section;
   timing means defining word time intervals;
   means for accessing the contents of one word location during each word time interval;
   first register means;
   means storing address information in said first register means identifying the word location at which said memory accessing is initiated;
   means connected between said first register means and said memory accessing means for controlling said memory accessing means to cause information to be alternately accessed from said first and second memory sections in adjacent word time intervals;
   comparing means responsive to said designator information derived together with each accessed second set number for comparing the second set number with a first set number accessed one word time interval later during the word time interval in which said first set number is accessed;
   second register means;
   means storing address information in said second register means identifying a unique word location;
   said comparing means including means for generating a signal in response to a successful comparison defined as a comparison between a first set number whose magnitude is greater than an associated high limit or less than an associated low limit; and
   means responsive either to said generated signal or information accessed from the location identified by the information stored in said second register means for terminating said memory accessing.

12. Data processing apparatus adapted to compare each of a first set of digitally represented numbers with a corresponding number in a second set of digitally represented numbers comprising:
   a rotatable memory device defining a plurality of tracks each including a plurality of word locations therein, each of said first set numbers being stored in a unique word location in a first of said tracks and each of said second set numbers being stored in a unique word location in a second of said tracks;
   timing means defining a series of word time intervals;
   means for reading the information stored in one word location during each word time interval;
   first register means;
   comparison means; and
   means for causing information to be read from said second track during odd word time intervals and stored in said first register means and for causing information to be read from said first track and from said first register means and applied to said comparison means during even word time intervals whereby one-half of said first set numbers can be compared during one revolution of said memory device.

13. Data processing apparatus adapted to compare each of a first set of digitally represented numbers with a corresponding number in a second set of digitally represented numbers comprising:
   a rotatable memory device defining a plurality of tracks each including a plurality of word locations therein, each of said first set numbers being stored in a unique word location in a first of said tracks and each of said second set numbers being stored in a unique word location in a second of said tracks;
   timing means defining a series of word time intervals means for reading the information stored in one word location during each word time interval;
first register means;
comparison means;
second register means;
means storing address information in said second register means identifying a unique second track starting word location;
means responsive to said address information in said second register means for reading the contents of the identified starting word location into said first register means during a first odd word time interval;
means for reading the contents of succeeding second track word locations into said first register means during succeeding odd word time intervals; and
means for reading the contents of a first track word location into said comparison means together with the information stored in said first register means during an immediately preceding word time interval, during each even word time interval.

14. Data processing apparatus adapted to compare each of a first set of digitally represented numbers with a corresponding number in a second set of digitally represented numbers comprising:
a rotatable memory device defining a plurality of tracks each including a plurality of word locations therein, each of said first set numbers being stored in a unique word location in a first of said tracks and each of said second set numbers being stored in a unique word location in a second of said tracks;
timing means defining a series of word time intervals;
means for reading the information stored in one word location during each word time interval;
first register means;
comparison means;
second register means;
means storing address information in said second register means identifying a unique second track starting word location;
means responsive to said address information in said second register means for reading the contents of the identified starting word location into said first register means during a first odd word time interval;
means for reading the contents of succeeding second track word locations into said first register means during succeeding odd word time intervals;
means for reading the contents of a first track word location into said comparison means together with the information stored in said first register means during an immediately preceding word time interval during each even word time interval;
third register means;
means storing address information in said third register means identifying a unique second track terminating word location; and
means inhibiting further reading of information into said comparison means in response to the reading of information from the identified terminating word location during an odd word time interval.

15. Data processing apparatus adapted to compare each of a first set of digitally represented numbers with a corresponding number in a second set of digitally represented numbers comprising:
a rotatable memory device defining a plurality of tracks each including a plurality of word locations therein, each of said first set numbers being stored in a unique word location in a first of said tracks and each of said second set numbers being stored in a unique word location in a second of said tracks;
timing means defining a series of word time intervals;
means for reading the information stored in one word location during each word time interval;
first register means;
comparison means;
second register means;
means storing address information in said second register means identifying a unique second track starting word location;
means responsive to said address information in said second register means for reading the contents of the identified starting word location into said first register means during a first odd word time interval;
means for reading the contents of succeeding second track word locations into said first register means during succeeding odd word time intervals;
means for reading the contents of a first track word location into said comparison means together with the information stored in said first register means during an immediately preceding word time interval during each even word time interval;
means for generating a signal designating the completion of one full rotation of said memory device subsequent to the reading of information from said starting word location;
means responsive to said signal for thereafter reading the contents of second track word locations during even word time intervals and for reading the contents of first track word locations and the contents of said first register means into said comparison means during odd word time intervals; a third register means;
means storing address information in said third register means identifying a unique second track terminating word location; and
means inhibiting further reading of information into said comparison means in response to the reading of information from the identified terminating word location.

16. Data processing apparatus adapted to compare each of a first set of digitally represented numbers with a corresponding number in a second set of digitally represented numbers, constituting limits, to determine whether the magnitude of the number in said first set is greater than a high limit or less than a low limit comprising:
a rotatable memory device defining a plurality of tracks each including a plurality of word locations therein, each of said first set numbers being stored in a unique word location in a first of said tracks and each of said second set numbers being stored in a unique word location in a second of said tracks together with designator information designating whether said second set number represents a high or low limit;
timing means defining a series of word time intervals;
means for reading the information stored in one word location during each word time interval;
first register means;
means of causing information to be read from said second track during odd word time intervals and stored in said first register means;
comparison means responsive to said designator information in said first register means; and
means for causing information to be read from said first track and from said first register means and for applying such information to said comparison means during even word time intervals.

17. Data processing apparatus adapted to compare each of a first set of digitally represented numbers with a corresponding number in a second set of digitally represented numbers, constituting limits, to determine whether the magnitude of the number in said first set is greater than a high limit or less than a low limit comprising:
a rotatable memory device defining a plurality of tracks each including a plurality of word locations therein, each of said first set numbers being stored twice in a unique word location in a first of said tracks and a pair of second set numbers together with designator information designating whether each second set number represents a high or low limit, being stored in a unique word location in a second of said tracks;
timing means defining a series of word time intervals;

means for reading the information stored in one word location during each word time interval;
first register means;
means for causing the information read from said second track to be stored in said first register means during odd word time intervals;
comparison means responsive to said designator information; and
means for causing information to be read from said first track and from said first register means and for applying such information to said comparison means during even word time intervals.

18. Data processing apparatus adapted to compare each of a first set of digitally represented numbers with a corresponding number in a second set of digitally represented numbers, constituting limits, to determine whether the magnitude of the number in said first set is greater than a high limit or less than a low limit comprising:
a rotatable memory device defining a plurality of tracks each including a plurality of word locations therein, each of said first set numbers being stored twice in a unique word location in a first of said tracks and a pair of second set numbers together with designator information designating whether each second set number represents a high or low limit, being stored in a unique word location in a second of said tracks;
timing means defining a series of word time intervals;
means for reading the information stored in one word location during each word time interval;
first register means;
comparison means responsive to said designator information;
second register means;
means storing address information in said second register means identifying a unique second track starting word location;
means responsive to said address information in said second register means for reading the contents of the identified starting word location into said first register means during a first odd word time interval;
means for reading the contents of succeeding second track word locations into said first register means during succeeding odd word time intervals;
means for reading the contents of a first track word location into said comparison means together with the information stored in said first register means during an immediately preceding word time interval during each even word time interval;
third register means;
means storing address information in said third register means identifying a unique second track terminating word location; and
means inhibiting further reading of information into said comparison means in response to the reading of information from the identified terminating word location during an odd word time interval.

19. Data processing apparatus adapted to compare each of a first set of digitally represented numbers with a corresponding number in a second set of digitally represented numbers, constituting limits, to determine whether the magnitude of the number in said first set is greater than a high limit or less than a low limit comprising:
a rotatable memory device defining a plurality of track each including a plurality of word locations therein, each of said first set numbers being stored twice in a unique word location in a first of said tracks and a pair of second set numbers together with designator information designating whether each second set number represents a high or low limit, being stored in a unique word location in a second of said tracks;
timing means defining a series of word time intervals;
means for reading the information stored in one word location during each word time interval;
first register means;
comparison means responsive to said designator information;
second register means;
means storing address information in said second register means identifying a unique second track starting word location;
means responsive to said address information in said second register means for reading the contents of the identified starting word location into said first register means during a first odd word time interval;
means for reading the contents of succeeding second track word locations into said first register means during succeeding odd word time intervals;
means for reading the contents of a first track word location into said comparison means together with the information stored in said first register means during an immediately preceding word time interval during each even word time interval;
third register means;
means storing address information in said third register means identifying a unique second track terminating word location; and
means inhibiting further reading of information into said comparison means in response to the reading of information from the identified terminating word location.

References Cited by the Examiner

UNITED STATES PATENTS

| | | | |
|---|---|---|---|
| 2,885,659 | 5/1959 | Spielberg | 340—174 |
| 2,991,453 | 7/1961 | Leonard | 340—172.5 |
| 3,045,213 | 7/1962 | Zschekel | 235—167 |
| 3,132,324 | 5/1964 | Estrems | 340—172.5 |

OTHER REFERENCES

Cohen, A. A., "Magnetic Drum Storage for Digital Information Processing Systems" IV, 29 Mathematical Tables and Other Aids to Computation 31–39, (January, 1950).

MALCOLM A. MORRISON, *Primary Examiner.*

ROBERT C. BAILEY, *Examiner.*

I. FAIBISCH, *Assistant Examiner.*